United States Patent
Egawa et al.

(10) Patent No.: US 9,381,760 B2
(45) Date of Patent: Jul. 5, 2016

(54) SHEET PROCESS DEVICE

(71) Applicant: KYOCERA Document Solutions Inc., Osaka (JP)

(72) Inventors: Keisuke Egawa, Osaka (JP); Masuo Kawamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 63 days.

(21) Appl. No.: 14/457,352

(22) Filed: Aug. 12, 2014

(65) Prior Publication Data
US 2015/0076316 A1 Mar. 19, 2015

(30) Foreign Application Priority Data
Sep. 18, 2013 (JP) ................................. 2013-192547

(51) Int. Cl.
*F16M 11/04* (2006.01)
*B41J 29/02* (2006.01)
*B41J 29/13* (2006.01)
*F16M 11/00* (2006.01)

(52) U.S. Cl.
CPC *B41J 29/02* (2013.01); *B41J 29/13* (2013.01); *F16M 11/00* (2013.01); *F16M 11/04* (2013.01); *F16M 2200/08* (2013.01)

(58) Field of Classification Search
USPC ............. 248/163.1, 188, 188.2, 188.5, 188.8, 248/188.9, 677, 676, 678
See application file for complete search history.

(56) References Cited

U.S. PATENT DOCUMENTS

| 5,094,023 | A | * | 3/1992 | McVey | G09F 7/22 248/188.5 |
|---|---|---|---|---|---|
| 6,755,381 | B1 | * | 6/2004 | Levin | E01F 9/012 248/163.1 |
| 7,434,278 | B2 | * | 10/2008 | White | A61G 7/1015 5/81.1 HS |
| 8,240,681 | B2 | | 8/2012 | Taguchi | |
| 2002/0130229 | A1 | * | 9/2002 | Coleman | F16M 11/34 248/163.1 |
| 2002/0179788 | A1 | * | 12/2002 | Crookham | E04G 1/24 248/188 |

(Continued)

FOREIGN PATENT DOCUMENTS

| JP | H09-236960 A | 9/1997 |
|---|---|---|
| JP | 2000-37925 | 2/2000 |
| JP | 2008-001516 A | 1/2008 |
| JP | 2009-217182 A | 9/2009 |
| JP | 2012-250804 | 12/2012 |

OTHER PUBLICATIONS

An Office Action issued by the Japanese Patent Office on Feb. 9, 2016, which corresponds to Japanese Patent Application No. 2013-192547 and is related to U.S. Appl. No. 14/457,352.

(Continued)

*Primary Examiner* — Alfred J Wujciak
(74) *Attorney, Agent, or Firm* — Studebaker & Brackett PC

(57) ABSTRACT

A sheet process device includes a processing part unit and a leg part unit. The processing part unit performs post process for a sheet ejected from an image forming apparatus. The leg part unit supports the processing part unit height-adjustably. The leg part unit includes a leg member, a fixed supporting member, and a movable supporting member. The leg member is extendable/contractable in upward and downward directions. The fixed supporting member is extended from a lower end of the leg member in a horizontal direction. The movable supporting member is stored in the fixed supporting member at the lower end of the leg member and extended in another horizontal direction being different from the extending direction of the fixed supporting member.

3 Claims, 8 Drawing Sheets

(56) References Cited

U.S. PATENT DOCUMENTS

2005/0161560 A1* 7/2005 Kjellman ............... F16M 11/16
                                                       248/163.1
2012/0080562 A1* 4/2012 Auger ..................... A64G 1/16
                                                       244/171.7

OTHER PUBLICATIONS

An Office Action issued by the Japanese Patent Office on Dec. 1, 2015, which corresponds to Japanese Patent Application No. 2013-192547 and is related to U.S. Appl. No. 14/457,352.

* cited by examiner

SHEET PROCESS DEVICE

INCORPORATION BY REFERENCE

This application is based on and claims the benefit of priority from Japanese Patent application No. 2013-192547 filed on Sep. 18, 2013, the entire contents of which are incorporated herein by reference.

BACKGROUND

The present disclosure relates to a sheet process device carrying out post processes (punch process, staple process, sorting process and others) for a sheet ejected from an image forming apparatus.

Conventionally, a sheet process device may be connected to a side face of an image forming apparatus and used different types of image forming apparatuses in common. In such a case, because the height of a sheet ejection port depends on the type of the image forming apparatus, it is necessary to adjust the height of a sheet reception port of the sheet process device and match it with the height of the sheet ejection port.

There is a sheet process device configured so that the heights of wheels arranged to a housing can be adjusted. In this sheet process device, a bearing of the wheel is attached turnably to one end of a longitudinal bearing member and another end of the bearing member is attached turnably to the housing of the sheet process device. If the bearing member is turned with respect to the housing, the height of the wheel supported by the bearing is varied, and then, the height of the sheet reception port of the sheet process device may be varied.

Alternatively, a height adjustment pedestal, on which the sheet process device is placed, may be used. In accordance with attachment and detachment of the height adjustment pedestal, the height of the sheet process device may be varied in two steps.

However, in a case of varying the height of the sheet reception port by adjusting the heights of the wheels, because variation range of the height of the bearing of the wheel is small, in spite of being capable of finely adjusting the height, there is a problem that the sheet process device cannot be applied to the image forming apparatus having the sheet ejection port being remarkably different from the sheet reception port in the height. Moreover, because the height of the height adjustment pedestal is determined so as to match the height of the sheet ejection port of the image forming apparatus, it is necessary to prepare the height adjustment pedestals for every image forming apparatuses being different from each other in the height of the sheet ejection port, and therefore, there is a problem that labor and time are taken.

Conventionally, a sheet process device including a processing part performing post processes and leg parts extendable/contractable in a height direction has been also put to practical use. In this sheet process device, it is necessary to lift up the processing part in order to extend/contract the leg parts, and then, the leg parts are floated from a setting surface when the processing part is lifted up. Therefore, the sheet process device may be hardly handled by one worker.

SUMMARY

In accordance with an embodiment of the present disclosure, a sheet process device includes a processing part unit and a leg part unit. The processing part unit performs post process for a sheet ejected from an image forming apparatus. The leg part unit supports the processing part unit height-adjustably. The leg part unit includes a leg member, a fixed supporting member, and a movable supporting member. The leg member is extendable/contractable in upward and downward directions. The fixed supporting member is extended from a lower end of the leg member in a horizontal direction. The movable supporting member is stored in the fixed supporting member at the lower end of the leg member and extended in another horizontal direction being different from the extending direction of the fixed supporting member.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 4A illustrates a condition where the movable supporting member is extended, and FIG. 4B illustrates a condition where the movable supporting member is stored.

DETAILED DESCRIPTION

In the following, with reference the drawings, a sheet process device according to an embodiment of the present disclosure will be described.

Figure 1:
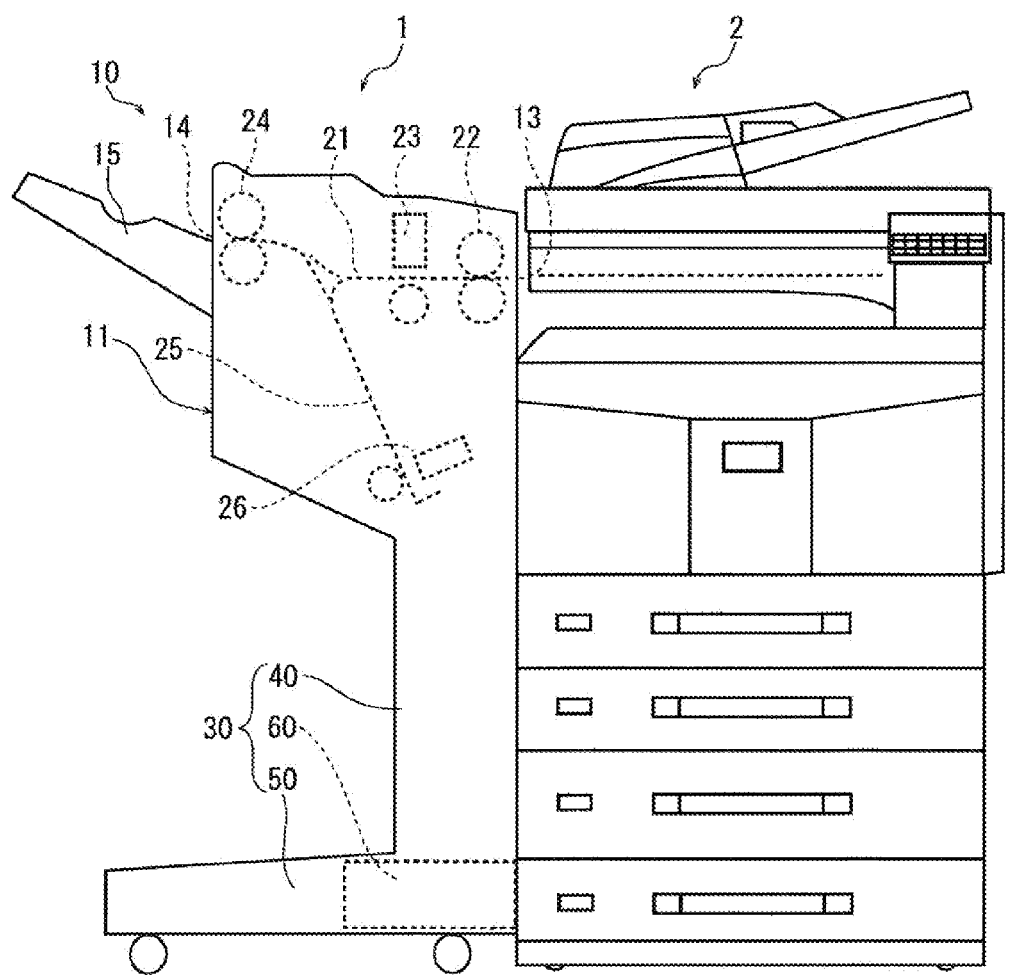
FIG. 1 is a front view schematically showing a sheet process device, in a condition of being connected to an image forming apparatus, according to an embodiment of the present disclosure.
Figure 2:
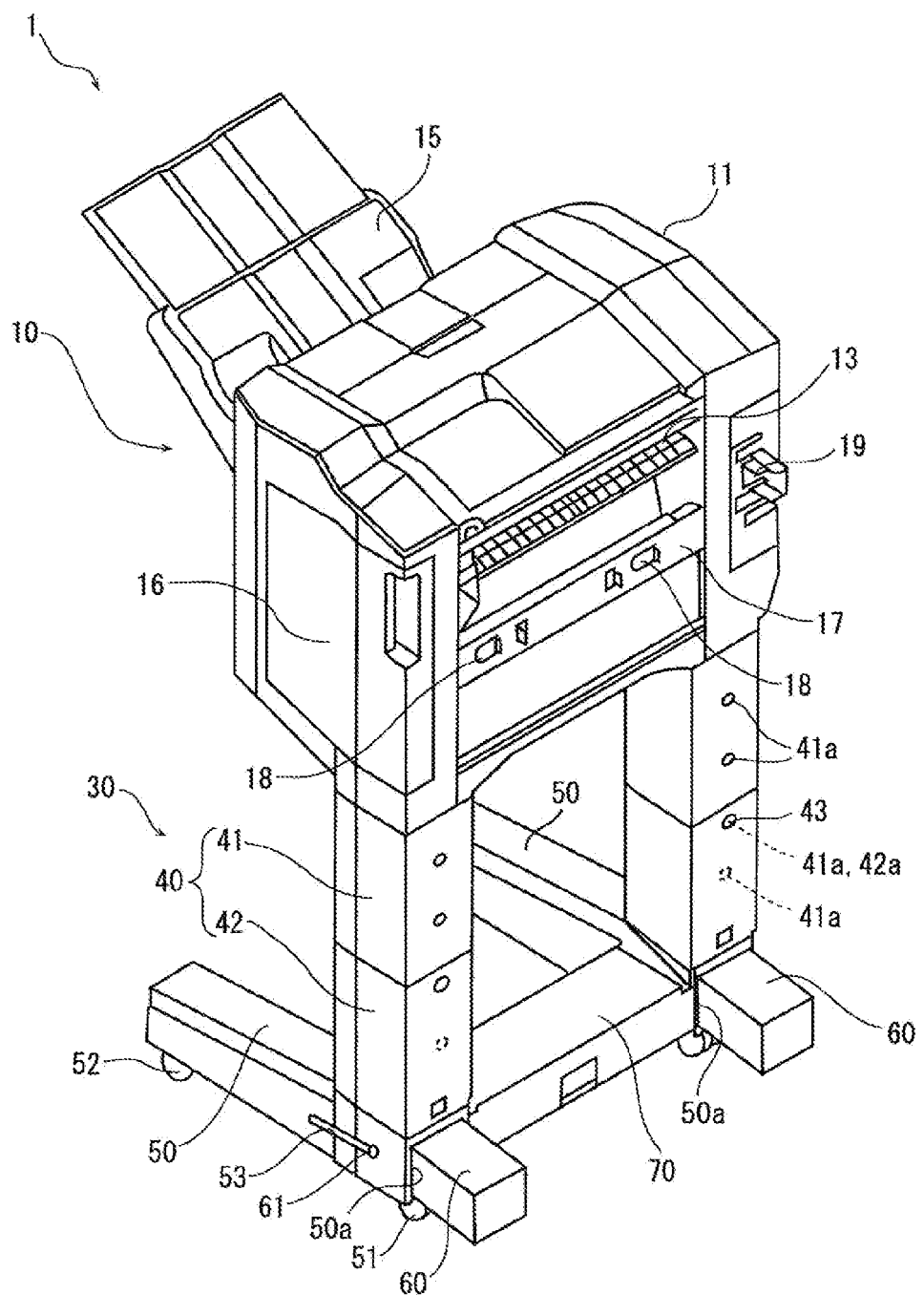
FIG. 2 is a perspective view showing the sheet process device according to the embodiment of the present disclosure.
Figure 3:
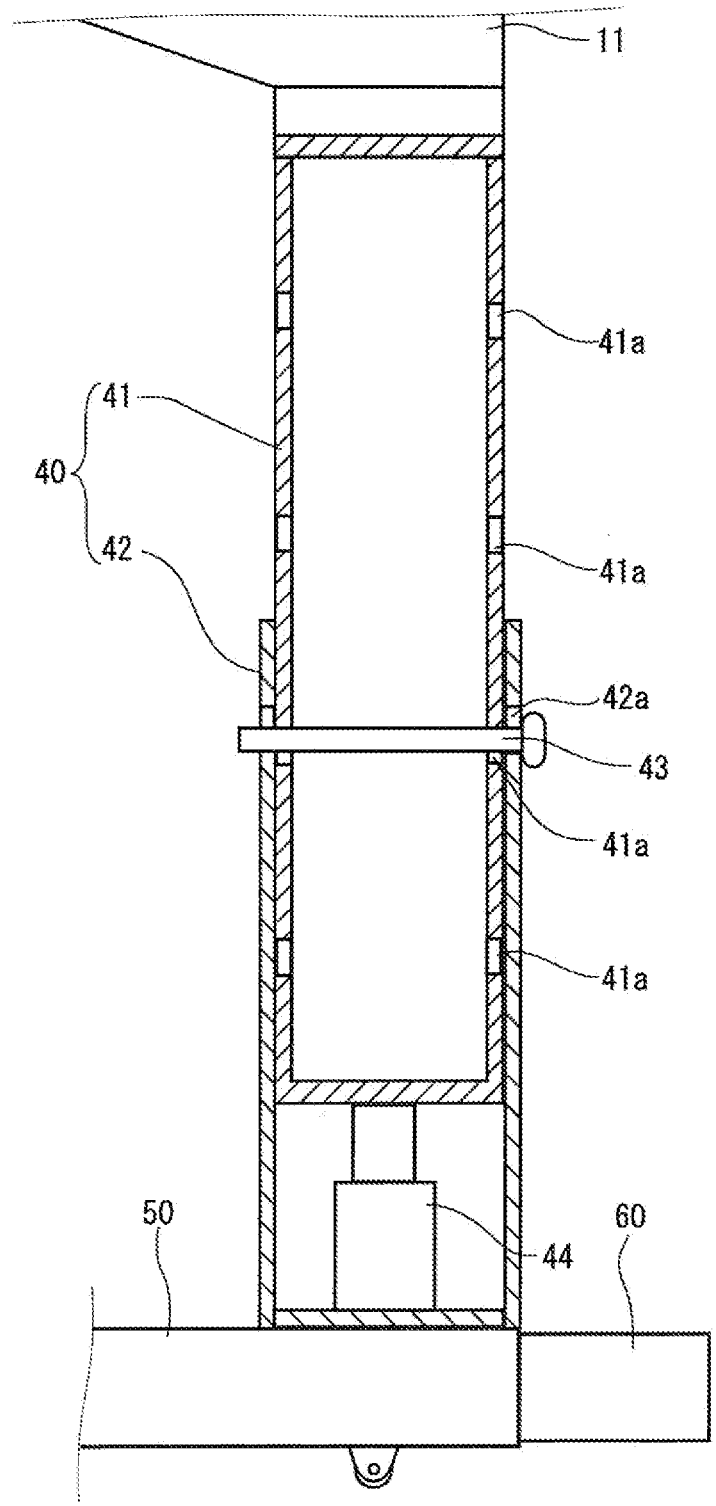
FIG. 3 is a longitudinal sectional view showing a leg member of a leg part unit in the sheet process device according to the embodiment of the present disclosure.
Figure 4A:
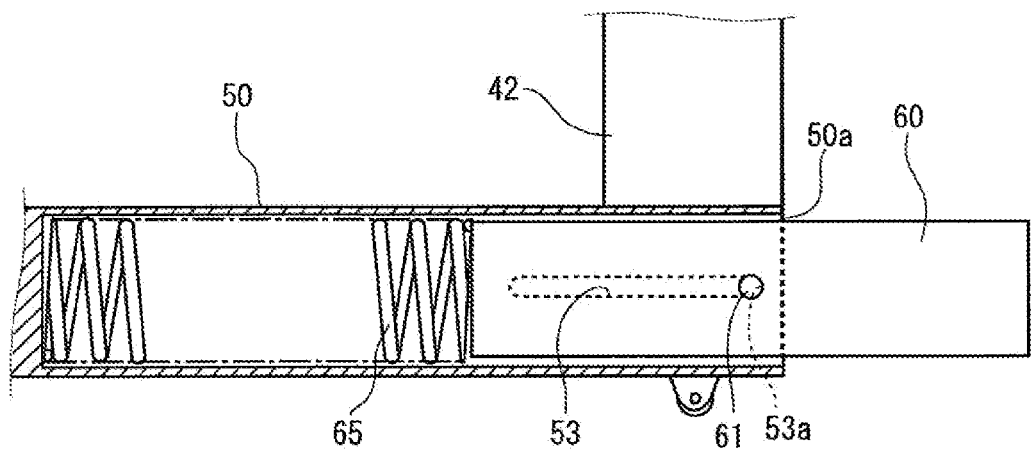
FIGS. 4A and 4B are front sectional views showing a fixed supporting member and a movable supporting member in the leg part unit of the sheet process device according to the embodiment of the present disclosure.
Figure 4B:
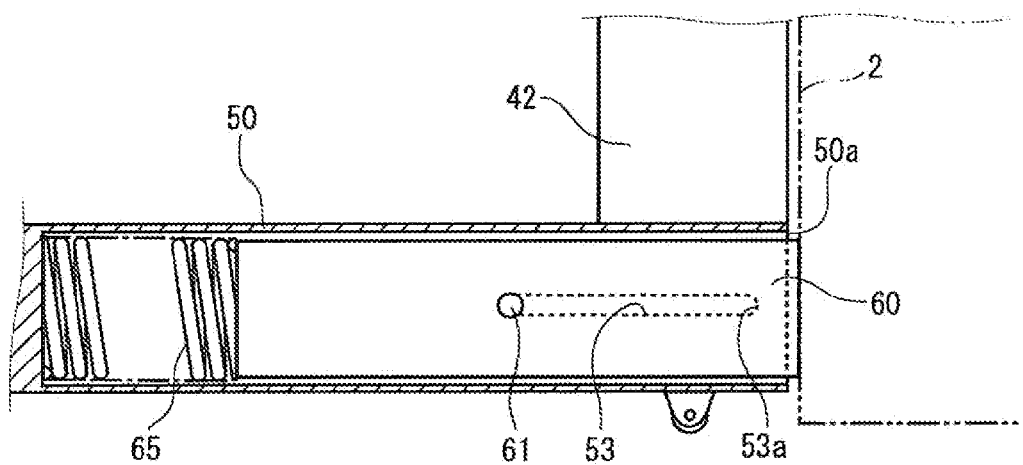
Figure 5:
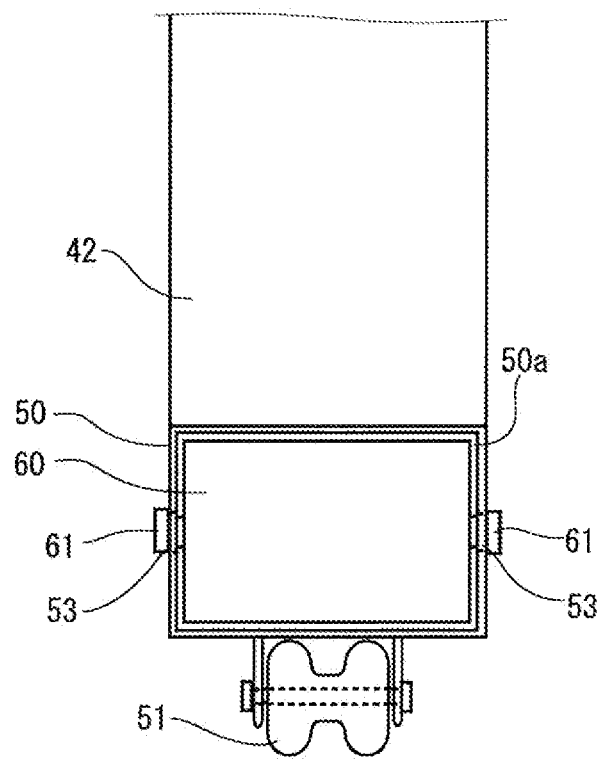
FIG. 5 is a side view showing the fixed supporting member and movable supporting member in the leg part unit of the sheet process device according to the embodiment of the present disclosure.
Figure 6:
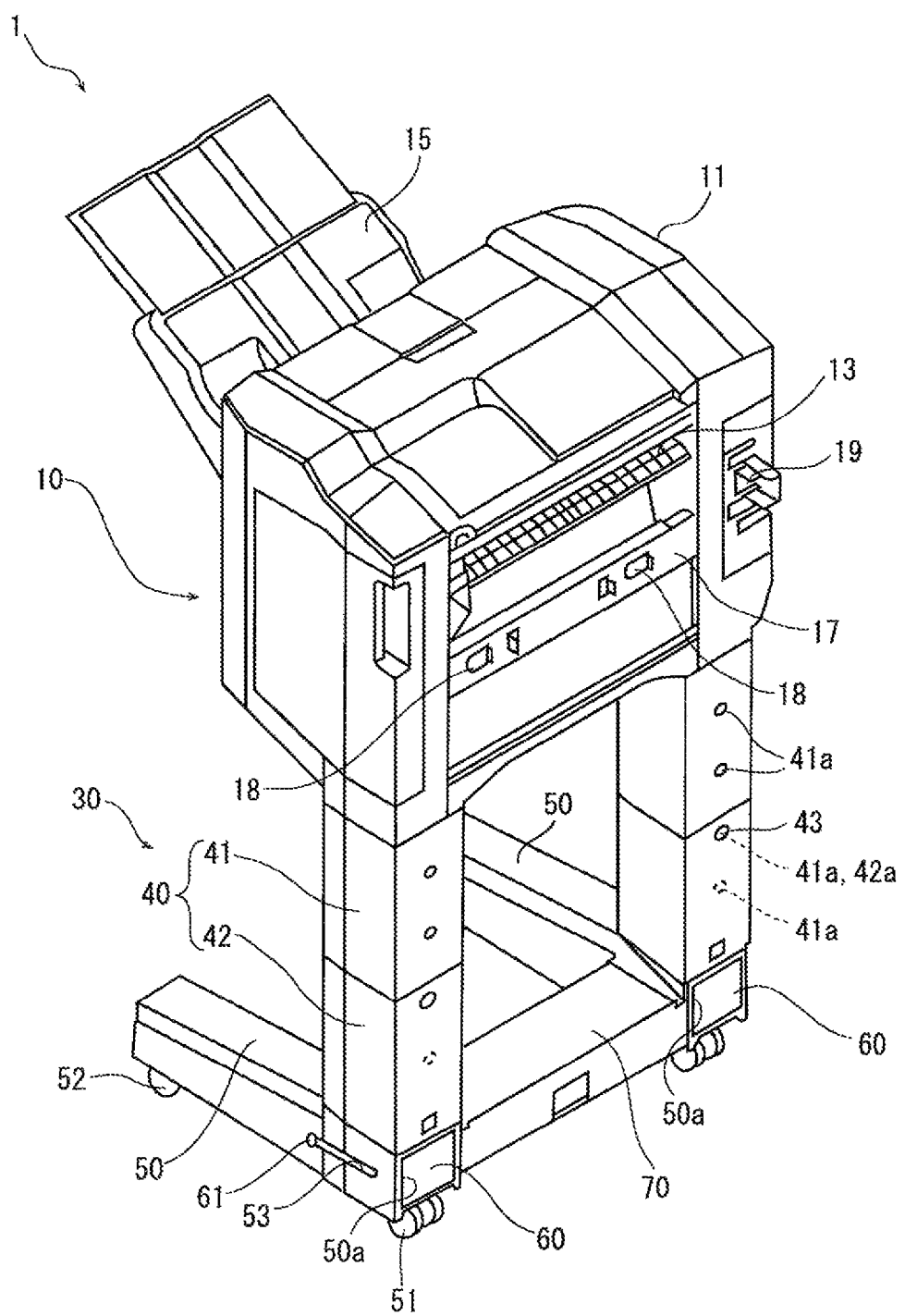
FIG. 6 is a perspective view showing the sheet process device, in a condition where the movable supporting member is stored in the fixed supporting member, according to the embodiment of the present disclosure.

With reference to FIGS. 1 to 6, the entire structure of the sheet process device according to the embodiment of the present disclosure will be described. FIG. 1 is a front view schematically showing the sheet process device, in a condition of being connected to an image forming apparatus. FIG. 2 is a perspective view showing the sheet process device. FIG. 3 is a longitudinal sectional view showing a leg member of a leg part unit in the sheet process device. FIGS. 4A and 4B are front sectional views showing a fixed supporting member and a movable supporting member in the leg part unit of the sheet process device. FIG. 4A illustrates a condition where the movable supporting member is extended and FIG. 4B illustrates a condition where the movable supporting member is stored. FIG. 5 is a side view showing the fixed supporting member and movable supporting member in the leg part unit of the sheet process device. FIG. 6 is a perspective view showing the sheet process device, in a condition where the movable supporting member is stored in the fixed supporting member. In the following description, an orthogonal direction to forward and backward directions as viewed from the front side of the image forming apparatus is left and right directions.

As shown in FIG. 1, the sheet process device 1 is used in a state of being connected to a side face (a left side face), where a sheet is ejected, of the image forming apparatus 2. The sheet process device 1 includes a processing part unit 10 and a leg part unit 30. The processing part unit 10 performs post processes for the sheet ejected from the image forming apparatus 2. The leg part unit 30 supports the processing part unit 10 height-adjustably.

The processing unit 10 includes a main body 11 formed in a rectangular parallelepiped shape elongated in upward and downward directions. The main body 11 is formed with a sheet reception port 13 receiving the sheet ejected from a sheet ejection port of the image forming apparatus 2 on a side face (a right side face) at a connection side to the image forming apparatus 2. On the other side face (a left side face) at an opposite side to the connection side to the image forming apparatus 2, the main body 11 is formed with a sheet ejection port 14 and, below the sheet ejection port 14, an ejected sheet tray 15 is attached.

Inside the main body 11, a sheet conveying path 21 extending from the sheet reception port 13 to the sheet ejection port 14 is arranged. Along the sheet conveying path 21, a carrying-in roller 22 composed of a pair of upper and lower rollers, a punch processing part 23 and a carrying-out roller 24 composed of a pair of upper and lower rollers are located in an order from an upstream side. The sheet conveying path 21 diverges at a downstream side of the punch processing part 23 to lead to an intermediate tray 25. In a lower end part of the intermediate tray 25, a staple processing part 26 is arranged.

The process operation of the processing part unit 10 will be described. The sheet ejected from the sheet ejection port of the image forming apparatus 2 is entered into the sheet reception port 13 of the sheet process device 1 and conveyed to the conveying path 21 by the carrying-in roller 22. Subsequently, the sheet is punched by the punch processing part 23, and then, ejected from the sheet ejecting port 14 onto the ejected sheet tray 15 by the carrying-out roller 24. Alternatively, the sheet advances to the intermediate tray 25 diverged at the downstream side of the punch processing part 23, and then, is stapled by the stable processing part 26, conveyed to the carrying-out roller 24, and further, ejected from the sheet ejection port 14 onto the ejected sheet tray 15.

As shown in FIG. 2, the main body 11 is configured so as to be opened/closed by a cover 16 arranged in a front face. On the right side face of the main body 11, a connection part 17 to the image forming apparatus 2 is formed below the sheet reception port 13. The connection part 17 is a plate like member elongated in the forward and backward directions of the sheet process device 1 and is attached slidably in the forward and backward directions of the sheet process device 1. In the connection part 17, openings 18 are formed at a predetermined distance. On the other hand, on the left side face of the image forming apparatus 2, protrusions (not shown) protruded leftward are arranged. The protrusions are inserted into the openings 18 of the connection part 17, and then, the connection part 17 is slid so as to engage the protrusions with the opening 18, and thereby, the sheet process device 1 is connected with the image forming apparatus 2.

In the rear of the connection part 17, a connector 19 connecting to an interface cable extended from the image forming apparatus 2 is arranged.

Next, the leg part unit 30 will be described. The leg part unit 30 includes two leg beams (leg members) 40, fixed supporting beams (fixed supporting members) 50, movable supporting beams (movable supporting members) 60 and a connection beam 70. The leg beams 40 are configured to be extendable/contractable in a height direction. The fixed supporting beams 50 are extended from respective lower ends of the leg beams 40 in a horizontal direction. The movable supporting beams 60 are extended from respective lower ends of the leg beams 40 in an opposite direction to the extending direction of the fixed supporting beams 50. The connection beam 70 is bridged between the two fixed supporting beams 50 under lower ends of the leg beams 40.

The leg beams 40 are positioned at a right forward corner and a right backward corner on a lower face of the main body 11. The leg beam 40 is formed, as shown in FIG. 3, in a hollow square pillar shape to have an upper inner tube body 41 and a lower outer tube body 42 into which the inner tube body 41 is slidably fitted. An upper end of the inner tube body 41 is fixed to the lower face of the main body 11 and a lower end of the outer tube body 42 is fixed to a top face of the fixed supporting beam 50. In the inner tube body 41, a plurality of through holes 41a are bored penetrating in the left and right directions of the sheet process device 1 at predetermined intervals in the upward and downward directions. In an upper end part of the outer tube body 42, a through hole 42a is bored penetrating in the left and right directions of the sheet process device 1.

Into the through hole 41a being at a certain height of the inner tube body 41 and the through hole 42a of the outer tube body 42, a pin 43 is inserted, and thereby, the inner tube body 41 and outer tube body 42 are fixed. The inner tube body 41 is slid with respect to the outer inner tube 42 and the through hole 41a matching the height of the through hole 42a of the outer tube body 42 is selected, and thereby, the length of the leg beam 40 is determined. Thus, the height of the processing part unit 10 can be varied by a pitch of the through holes 41a of the inner tube body 41. Incidentally, since, in the leg beam 40, a damper 44 (a shock absorbing member) is arranged, the inner tube body 41 is supported without falling down suddenly even if the pin 43 is removed.

As shown in FIG. 2, the fixed supporting beam 50 is formed in a hollow square pillar shape and its length is almost the same as a width in the left and right directions of the main body 11 of the sheet process device 1. The fixed supporting beams 50 are horizontally extended from lower faces of the leg beams 40 in the left direction.

On a right end face of the fixed supporting beam 50, an opening 50a is formed. On the lower face of the fixed supporting beam 50, wheels 51 and 52 are attached along the extending direction of the fixed supporting beam 50 with a predetermined interval, and thereby, the sheet process device 1 can be moved on a horizontal plane. As shown in FIGS. 4A, 4B and 5, the fixed supporting beam 50 is formed with long holes 53 (guiding parts) extending horizontally on both side faces in the extending direction.

The movable supporting beam 60 is formed, as shown in FIGS. 4A and 4B, in a hollow square pillar shape and has a shorter length than the length of the fixed supporting beam 50 in the extending direction of the fixed supporting beam 50. As shown in FIGS. 4A, 4B and 5, the movable supporting beam 60 is formed with pins 61 (guided parts) protruded sideward (in a direction perpendicular to the extending direction of the fixed supporting beam 50) from both side faces in the extending direction of the fixed supporting beam 50.

The movable supporting beam 60 is stored in a hollow part of the fixed supporting beam 50 and projected from the opening 50a of the fixed supporting beam 50 in the right direction (a connection direction to the image forming apparatus). As shown in FIGS. 4A, 4B and 5, the pins 61 protruded sideward from both side faces of the movable supporting beam 60 are engaged with the long holes 53 of the fixed supporting beam 50. Thereby, the movable supporting beam 60 becomes slidable by the length of the long holes 53 in the horizontal direction with respect to the fixed supporting beam 50.

Inside the hollow part of the fixed supporting beam 50, between an end face of the movable supporting beam 60 and an end face of the hollowing part of the fixed supporting beam 50, a coil spring 65 (a biasing member) is arranged. The coil spring 65 biases, as shown in FIG. 4A, the movable supporting beam 60 in the right direction. The movable supporting beam 60 is biased in the right direction until the pin 61 is engagingly stopped by a right end 53a (an engagingly stopping part) of the long hole 53 and projected by a predetermined length from the opening 50a of the fixed supporting beam 50. On the other hand, as shown in FIG. 4B, when the movable supporting beam 60 is pushed in a direction toward the fixed supporting beam 50 against a biasing force of the coil spring 65, almost the whole of the movable supporting beam 60 is stored in the hollow part of the fixed supporting beam 50 and the pin 61 is moved to a left end of the long hole 53.

The connection beam 70 is formed in a hollow square pillar shape being thin in the height direction. The connection beam 70 is bridged between the fixed supporting beams 50 under lower ends of the leg beam 40.

A manner of connecting the sheet process device 1 configured as mentioned above to the image forming apparatus 2 will be described. First, the right side face, in which the sheet reception port 13 is formed, of the sheet process device 1 is faced to the left side face, in which the sheet ejection port is formed, of the image forming apparatus 2. Then, as shown in FIGS. 1, 4B and 6, the movable supporting beams 60 are pushed by the left side face of the image forming apparatus 2 and stored in the fixed supporting beams 50 against the biasing force of the coil spring 65.

Then, the sheet process device 1 is positioned and adjusted so that the protrusions of the image forming apparatus 2 are inserted into the openings 18 of the connection part 17. Subsequently, the connection part 17 is slid so that the protrusions are engaged with the openings 18, and then, the interface cable extended from the image forming apparatus 2 is connected to the connector 19 of the sheet process device 1. In a case of removing the sheet process device 1 from the image forming apparatus 2, the interface cable is removed and the connection part 17 is slid, and then, the connection between the sheet process device 1 and image forming apparatus 2 is released. After that, if the sheet process device 1 is moved in the left direction, the movable supporting beams 60 are separated from the left side face of the image forming apparatus 2, biased in the right direction by the coil spring 65 and projected by the predetermined length from the fixed supporting beams 50.

Figure 7:
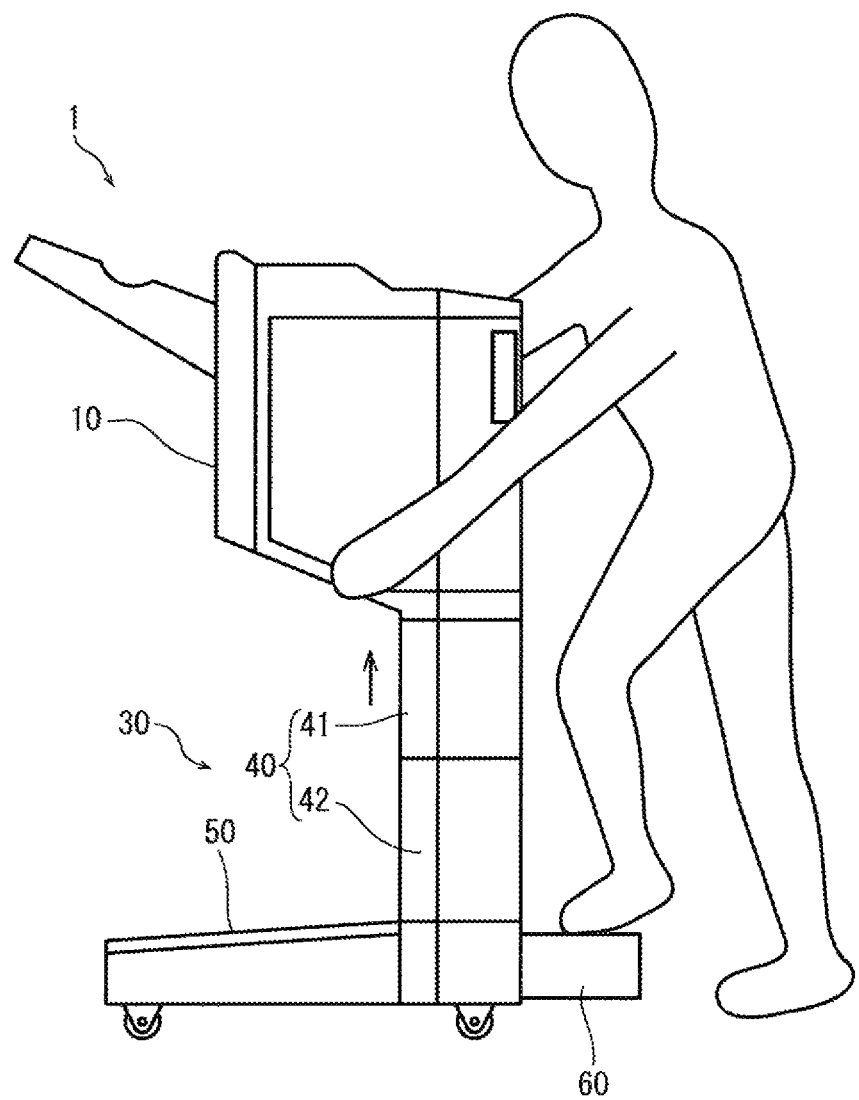
FIG. 7 is a front view schematically showing the sheet process device, in a situation where a processing part unit is lifted up by a worker, according to the embodiment of the present disclosure.
Figure 8:
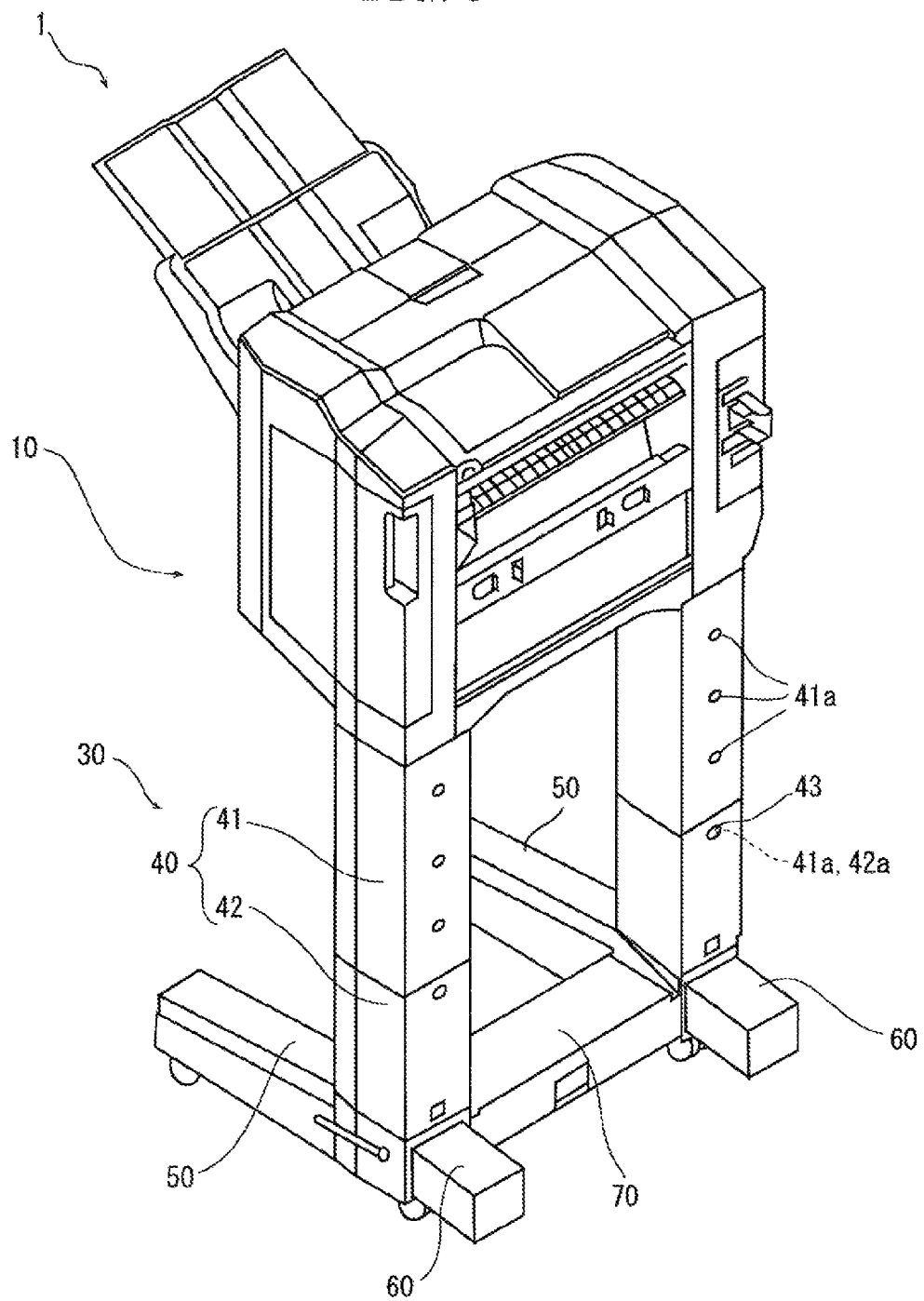
FIG. 8 is a perspective view showing the sheet process device, in a condition where the height of a sheet processing part is increased, according to the embodiment of the present disclosure.

Next, a manner of adjusting the height of the processing part unit 10 of the sheet process device 1 will be described with reference to FIGS. 7 and 8. FIG. 7 is a front view schematically showing the sheet process device, in a situation where a processing part unit is lifted up by a worker. FIG. 8 is a perspective view showing the sheet process device, in a condition where the height of the sheet processing part is increased. FIG. 8 illustrates a condition where the through hole 41a of the inner tube body 41 matched with the through hole 42a of the outer tube body 42 in the leg beam 40 of the sheet process device 1 is changed from the third through hole 41a to the fourth through hole 41a from the top, and then, the height of the processing part unit 10 is increased by the pitch of the through hole 41a.

In a case of increasing the height of the processing part unit 10, first, the pins 43 fixing the inner tube bodies 41 and outer tube bodies 42 of the two leg beam 40 are removed. Subsequently, as shown in FIG. 7, the worker holds the processing part unit 10 by both hands, holds down the movable supporting beam 60 by one foot and lifts up the processing part unit 10. The worker moves the processing part unit 10 upwardly until the fourth through holes 41a from the top of the inner tube bodies 41 of the leg part unit 30 are matched with the through holes 42a of the outer tube bodies 42 and inserts the pins 43 into the through holes 42a of the outer tube bodies 42 and the fourth through holes 41a from the top of the inner tube bodies 41, thereby fixing the outer tube bodies 42 and inner tube bodies 41 (refer to FIG. 8).

In a case of decreasing the height of the processing part unit 10, the pins 43 fixing the inner tube bodies 41 and outer tube bodies 42 of the two leg beam 40 are removed, and then, the worker presses down the processing part unit 10. The worker presses down the processing part unit 10 until the through holes 41a at a predetermined height of the inner tube bodies 41 are matched with the through holes 42a of the outer tube bodies 42 and then inserts the pins 43 into the through holes 42a of the outer tube bodies 42 and the through holes 41a of the inner tube bodies 41, thereby fixing the outer tube bodies 42 and inner tube bodies 41.

As described above, in accordance with the sheet process device 1 according to the embodiment of the present disclosure, in the case of increasing the height of the processing part unit 10, since the sheet process device 1 is configured to make the worker hold the processing part unit 10 by both hands, hold down the movable supporting beam 60 by one foot and lift up the processing part unit 10, it is possible to restrain the leg part unit 30 from floating and therefore to smoothly carry out the works even one worker.

Further, in a case of connecting the sheet process device 1 to the image forming apparatus 2, since the movable supporting beam 60 is pressed by the image forming apparatus 2 and automatically stored in the hollow part of the fixed supporting beam 50, labor and time for storing the movable supporting beam 60 are not taken.

When the processing part unit 10 is held and lifted up, the fixed supporting beam 50 or the connection beam 70 may be held by the foot. In such a case, a user of the sheet process device 1 may feel uncomfortable about stepping on the sheet process device 1 by the foot. In the embodiment, since the movable supporting beams 60 for the purpose of holding down by the foot are arranged separately from the fixed supporting beams 50 and connection beam 70, such an uncomfortable feeling is not given to the user. Even if the movable supporting beams 60 are damaged or dirtied in working, since the movable supporting beams 60 are stored in the fixed supporting beams 50 when connected to the image forming apparatus 2, exterior appearance is not spoiled. Incidentally, the movable supporting beams 60 may be configured to be stored in the connection beam 70.

In the sheet process device 1, since weight of the processing part unit 10, in which the pair of the rollers and others are stored, is heavier than the leg part unit 30 composed of mainly the hollow square pillars, a center of gravity is kept at a high position. Therefore, the sheet process device 1 may be fallen down during movement. However, since the fixed supporting beams 50 and movable supporting beams 60 are extended from the processing part unit 10 in the respective opposite directions, there are advantages that any beam becomes a prop when the sheet process device 1 is leaned, and therefore, the sheet process device 1 is hardly fallen down.

The entire length of the movable supporting beam 60 or the extended length of the movable supporting beam 60 from the fixed supporting beam 50 may be suitably adjusted in accordance with a shape or a size of the sheet process device 1.

In the embodiment of the present disclosure, the height of the processing part unit 10 can be varied by the pitch of the through holes 41a of the inner tube body 41 of the leg beam 40. Further, the positions of the through holes 41a and the pitch of the through holes 41a may be determined in accordance with the height of the sheet ejection port of the image forming apparatus 2 to which the sheet process device 1 should be connected. The sheet process device 1 may include a fine adjusting mechanism finely adjusting the height of the wheels 51 and 52 so that the height of the sheet reception port 13 is finely adjusted by the fine adjusting mechanism after the height of the sheet reception port 13 is roughly adjusted by adjusting the height of the through holes 41a of the inner tube body 41 of the leg beam 40.

Although, in the embodiment of the present disclosure, the wheels 51 and 52 are attached on the lower face of the fixed supporting beam 50, in another embodiment, the wheels 51 attached near the leg beams 40 may be attached to lower faces of the movable supporting beams 60.

Although, in the embodiment of the present disclosure, an extendable/contractable mechanism of the leg beam 40 is configured by the inner tube body 41 and outer tube body 42 fitted slidably, in another embodiment, another configuration may be applied to the extendable/contractable mechanism.

Although, in the embodiment of the present disclosure, as a guide mechanism guiding the movable supporting beam 60 in the horizontal direction and a stopper mechanism stopping movement of the movable supporting beam 60 in the extending direction, it is configured so that the fixed supporting beam 50 and movable supporting beam 60 respectively includes the long holes 53 and pins 61 engaged with the long holes 53, other configurations may be applied to the guide mechanism and stopper mechanism.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. A sheet process device comprising:
    a processing part unit performing post process for a sheet ejected from an image forming apparatus; and
    a leg part unit supporting the processing part unit height-adjustably,
        wherein the leg part unit includes
            a leg member extendable/contractable in upward and downward directions,
            a fixed supporting member extended from a lower end of the leg member in a horizontal direction, and
            a movable supporting member stored in the fixed supporting member at the lower end of the leg member and extended in another horizontal direction being different from the extending direction of the fixed supporting member,
    the fixed supporting member is extended from the lower end of the leg member in an opposite direction in a connection direction to the image forming apparatus,
    the movable supporting member is extended from the lower end of the leg member in the connection direction to the image forming apparatus,
    the movable supporting member is biased in the connection direction to the image forming apparatus with respect to the fixed supporting member by a biasing member, and stored in the fixed supporting member by being pushed by the image forming apparatus when connected to a side face of the image forming apparatus,
    the fixed supporting member has a guiding part extended in the horizontal direction,
    the movable supporting member has a guided part guided by the guiding part, and
    the guided part is guided by the guiding part of the fixed supporting member when the movable supporting member is biased in the connection direction to the image forming apparatus by the biasing member or when the movable supporting member is stored in the fixed supporting member by being pushed by the image forming apparatus, and then, the movable supporting member is moved in the horizontal direction, and
    the guiding part of the fixed supporting member has an engagingly stopping part at an end of the fixing supporting member adjacent to the image forming apparatus side,
    the movable supporting member is biased in the connection direction to the image forming apparatus by the biasing member until the guided part is engagingly stopped by the engagingly stopping part.

2. The sheet process device according to claim 1, wherein the leg member has an upper inner tube body and a lower outer tube body into which the upper inner tube body is slidably fitted,
    between the upper inner tube body and lower outer tube body, a shock absorbing member is arranged.

3. The sheet process device according to claim 1, wherein the leg part unit is configured to be movable horizontally.

* * * * *